United States Patent
Yu et al.

(10) Patent No.: US 10,061,861 B2
(45) Date of Patent: Aug. 28, 2018

(54) COMMON DECLARATIVE REPRESENTATION OF APPLICATION CONTENT AND USER INTERACTION CONTENT PROCESSED BY A USER EXPERIENCE PLAYER

(71) Applicants: Jay JieBing Yu, San Diego, CA (US); Matthew Sivertson, San Diego, CA (US); Vinay Kumar, San Diego, CA (US); Bojan Beran, San Diego, CA (US); Alex Balazs, San Diego, CA (US); Luis Felipe Cabrera, Bellevue, WA (US)

(72) Inventors: Jay JieBing Yu, San Diego, CA (US); Matthew Sivertson, San Diego, CA (US); Vinay Kumar, San Diego, CA (US); Bojan Beran, San Diego, CA (US); Alex Balazs, San Diego, CA (US); Luis Felipe Cabrera, Bellevue, WA (US)

(73) Assignee: Intuit Inc., Mountain View, CA (US)

( * ) Notice: Subject to any disclaimer, the term of this patent is extended or adjusted under 35 U.S.C. 154(b) by 19 days.

(21) Appl. No.: 14/463,415

(22) Filed: Aug. 19, 2014

(65) Prior Publication Data
US 2016/0055258 A1 Feb. 25, 2016

(51) Int. Cl.
*G06F 17/30* (2006.01)
*H04L 29/08* (2006.01)
*G06F 8/38* (2018.01)

(52) U.S. Cl.
CPC ........ *G06F 17/30905* (2013.01); *G06F 8/38* (2013.01); *G06F 17/30896* (2013.01); *H04L 67/02* (2013.01)

(58) Field of Classification Search
CPC ............ G06F 17/30905; G06F 8/38; G06F 17/30896; H04L 67/02
See application file for complete search history.

(56) References Cited

U.S. PATENT DOCUMENTS 6,754,668 B2   6/2004  Noble et al.
7,133,895 B1 * 11/2006  Lee .................... H04L 65/1069
                                                         709/204
(Continued)

FOREIGN PATENT DOCUMENTS

JP      2009217676 A    9/2009
KR   1020090042018 A    4/2009

OTHER PUBLICATIONS

International Search Report and Written Opinion issued in the corresponding International Application No. PCT/US2014/053168, dated Apr. 30, 2015 (13 pages).
(Continued)

*Primary Examiner* — Stephen Hong
*Assistant Examiner* — Hope C Sheffield
(74) *Attorney, Agent, or Firm* — Ferguson Braswell Fraser Kubasta PC

(57) ABSTRACT

A method for providing application content including obtaining, by a declarative content engine executing on a computer processor, an initial application content from a content repository and expressing the initial application content in a declarative programming language to obtain declarative content and transmitting the declarative content to a user experience player (UXP). The UXP processes the declarative content to obtain the initial application content, binds the initial application content to first platform-specific templates and first platform-specific navigation patterns, and renders the initial application content in a first platform-specific user display format. Additionally, the method includes receiving a user action from the UXP in response (Continued)

to the transmission of the declarative content, storing the user action associated with the declarative content in a user data instance repository, determining, using an interaction module and the received user action, a next application content, and obtaining the next application content from the content repository.

16 Claims, 6 Drawing Sheets

(56) References Cited

U.S. PATENT DOCUMENTS

| | | | |
|---|---|---|---|
| 7,149,776 B1* | 12/2006 | Roy | G06F 17/30873 |
| | | | 709/205 |
| 7,194,473 B1* | 3/2007 | Hichwa | H04L 67/02 |
| 7,712,023 B1 | 5/2010 | Bryan | |
| 8,356,276 B2 | 1/2013 | Bender | |
| 8,924,269 B2 | 12/2014 | Seubert et al. | |
| 8,930,253 B1 | 1/2015 | Ball | |
| 2001/0011250 A1* | 8/2001 | Paltenghe | G06F 21/6209 |
| | | | 705/41 |
| 2002/0165880 A1* | 11/2002 | Hornsby | G06F 15/0283 |
| | | | 715/209 |
| 2004/0135807 A1 | 7/2004 | Pickering et al. | |
| 2005/0114361 A1* | 5/2005 | Roberts | G06F 8/38 |
| 2006/0041546 A1 | 2/2006 | Ahn | |
| 2006/0242124 A1 | 10/2006 | Fields et al. | |
| 2007/0050778 A1 | 3/2007 | Lee et al. | |
| 2007/0073683 A1 | 3/2007 | Kobayashi et al. | |
| 2007/0078925 A1 | 4/2007 | Neil et al. | |
| 2007/0162274 A1 | 7/2007 | Ruiz et al. | |
| 2007/0238475 A1* | 10/2007 | Goedken | H04M 1/7253 |
| | | | 455/512 |
| 2011/0023016 A1 | 1/2011 | Khader et al. | |
| 2011/0154305 A1 | 6/2011 | Brian et al. | |
| 2011/0282714 A1 | 11/2011 | Cullen, III et al. | |
| 2012/0084185 A1 | 4/2012 | Ciaramitaro et al. | |
| 2012/0226708 A1 | 9/2012 | Srinivasa et al. | |
| 2012/0323889 A1 | 12/2012 | Marum et al. | |
| 2013/0117351 A1* | 5/2013 | Zoheir | G06F 17/30905 |
| | | | 709/203 |
| 2013/0159228 A1 | 6/2013 | Meijer et al. | |
| 2013/0283305 A1* | 10/2013 | Hirsch | G06F 8/20 |
| | | | 725/14 |
| 2014/0125672 A1 | 5/2014 | Winternitz et al. | |
| 2014/0129397 A1 | 5/2014 | Lazerson | |
| 2014/0136955 A1 | 5/2014 | Lee et al. | |
| 2014/0201616 A1* | 7/2014 | Turner | G06F 17/30896 |
| | | | 715/234 |
| 2014/0229814 A1 | 8/2014 | Wright et al. | |
| 2014/0280515 A1 | 9/2014 | Wei et al. | |
| 2015/0310052 A1 | 10/2015 | Konik et al. | |
| 2016/0027107 A1 | 1/2016 | McDonald et al. | |
| 2016/0078567 A1 | 3/2016 | Goldman et al. | |
| 2016/0092994 A1 | 3/2016 | Roebuck et al. | |

OTHER PUBLICATIONS

International Search Report and Written Opinion issued in corresponding PCT/US2014/072553 dated Jun. 30, 2015 (8 pages).
International Search Report and Written Opinion issued in corresponding application No. PCT/US2014/072559 dated Jul. 28, 2015 (10 pages).
International Search Report and Written Opinion issued in corresponding application No. PCT/US2014/072535 dated Jul. 29, 2015 (13 pages).
International Search Report and Written Opinion issued in corresponding application No. PCT/US2014/072543 dated Jul. 29, 2015 (13 pages).
Office Action in related Canadian Application No. 2,966,388 dated Jun. 1, 2017 (6 pages).
Extended European Search Report in related European Patent Application No. 14879253.4 dated Apr. 23, 2018 (12 pages).
Gitana Software Inc., "Alpaca—HTML5 Forms for JQuery—Form Buttons", Jun. 5, 2014, Retrieved from the Internet on Apr. 9, 2018: URL:https://web.archive.org/web/20140605100521/http://alpacajs.org:80/examples/components/form-controls/buttons.html (2 pages).
Gitana Software Inc., "Alpaca—Easy Forms for JQuery—Tools & Addons", Jun. 25, 2014, Retrieved from the Internet on Apr. 9, 2018: URL:https://web.archive.org/web/20140625105117/http://alpacajs.org/web/resources.html (1 page).
Anonymous: "Gitana/alpaca. GitHub Readme.md", Oct. 16, 2013, Retrieved from the Internet on Apr. 9, 2018: URL: https://web.archive.org/web/20131016124514/https://github.com/gitana/alpaca (4 pages).
Anonymous: "Content of save.php", Oct. 16, 2013, Retrieved from the Internet on Apr. 9, 2018: URL:https://web.archive.org/web/20131016124514/https://github.com/gitana/alpaca/archive/master.zip (1 page).
Anonymous: "jQuery Mobile—Wikipedia", Aug. 6, 2014, Retrieved from the Internet on Apr. 10, 2018: URL:https://en.wikipedia.org/w/index.php?title=Query_Mobile&oldid=620090108 (9 pages).

* cited by examiner

COMMON DECLARATIVE REPRESENTATION OF APPLICATION CONTENT AND USER INTERACTION CONTENT PROCESSED BY A USER EXPERIENCE PLAYER

BACKGROUND

Currently, a great variety of computing device platforms exists. Generally, each type of computing device platform includes platform-specific hardware with varied capabilities, as well as an optional operating system environment in which computer applications may function. A computer application is often designed to work within the construct of an operating system and to work with the operating system to take advantage of at least some aspects of the platform hardware. To this end, computer applications must often be re-designed, at least in part, to be able to function as desired with each of the various operating system and the platform hardware combinations. In such scenarios, each version of a computer application may require maintaining a separate application code base and separate accompanying programming effort for each environment in which a software vendor wants a computer application to function. The difficulty of such a task increases if the software vendor desires to create a different and/or unique user experience for different platforms on which a computer application is to execute. Alternatively, a software vendor may instead choose to only create one version of an application. The single version of the application may be intended to be deployed along with an execution environment (e.g., web browser, virtual machine, etc.) that is capable of interacting with the underlying operating system and/or platform hardware. In such scenarios, the computer application may not be capable of taking advantage of platform hardware capabilities due to the additional layer of abstraction (i.e., the execution environment) existing between the computer application and the underlying hardware.

SUMMARY

In general, in one aspect, the invention relates to a method for providing application content that includes obtaining, by a declarative content engine executing on a computer processor, an initial application content from a content repository. The method also includes expressing the initial application content in a declarative programming language to obtain declarative content and transmitting the declarative content to a user experience player. The user experience player processes the declarative content to obtain the initial application content, binds the initial application content to first platform-specific templates and first platform-specific navigation patterns, and renders the initial application content in a first platform-specific user display format. Additionally, the method includes receiving a user action from the user experience player in response to the transmission of the declarative content, storing the user action associated with the declarative content in a user data instance repository, determining, using an interaction module and the received user action, a next application content, and obtaining the next application content from the content repository.

In general, in one aspect, the invention relates to a method for providing application content that includes receiving, at a user experience player, declarative content from a declarative content engine and processing, by a computer processor, the declarative content to obtain the application content. The method also includes binding the application content to platform-specific templates and platform-specific navigation patterns, displaying the application content in a platform-specific user display format, receiving a user action in response to displaying the application content, transmitting the user action to the declarative content engine, and receiving, in response to the transmission of and based on the user action, next declarative content from the declarative content engine.

In general, in one aspect, the invention relates to a system for providing application content that includes a plurality of computer processors, a memory, and a declarative content engine executing on a first computer processor of the plurality of computer processors. The declarative content engine includes functionality to obtain an initial application content from a content repository, express the initial application content in a declarative programming language to obtain declarative content, and transmit the declarative content to a user experience player. The declarative content engine also includes functionality to receive a user action from the user experience player in response to the transmission of the declarative content, store the user action associated with the declarative content in a user data instance repository, determine, using an interaction module and based on the received user action, a next application content, and obtain the next application content from the content repository. The system also includes a user experience player executing on a second computer processor of the plurality of computer processors. The user experience player includes functionality to receive declarative content from the declarative content engine, process, by the second computer processor, the declarative content to obtain the initial application content, bind the initial application content to platform-specific templates and platform-specific navigation patterns, and display the initial application content in a platform-specific user display format. The user experience player also includes functionality to receive the user action in response to displaying the initial application content, transmit the user action to the declarative content engine, and receive, in response to the transmission of the user action, next declarative content from the declarative content engine.

In general, in one aspect, the invention relates to a non-transitory computer readable medium comprising instructions for providing application content which, when executed, cause a computer processor to obtain, by a declarative content engine executing on a computer processor, an initial application content from a content repository and express the initial application content in a declarative programming language to obtain declarative content. The instructions also cause a computer processor to transmit the declarative content to a user experience player. The user experience player includes functionality to process the declarative content to obtain the initial application content, bind the initial application content to first platform-specific templates and first platform-specific navigation patterns, and render the initial application content in a first platform-specific user display format. The instructions also cause the computer processor to receive a user action from the user experience player in response to the transmission of the declarative content, store the user action associated with the declarative content in a user data instance repository, determine, using an interaction module and the received user action, a next application content, and obtain the next application content from the content repository.

Other aspects of the invention will be apparent from the following description and the appended claims.

DETAILED DESCRIPTION

Figure 1:
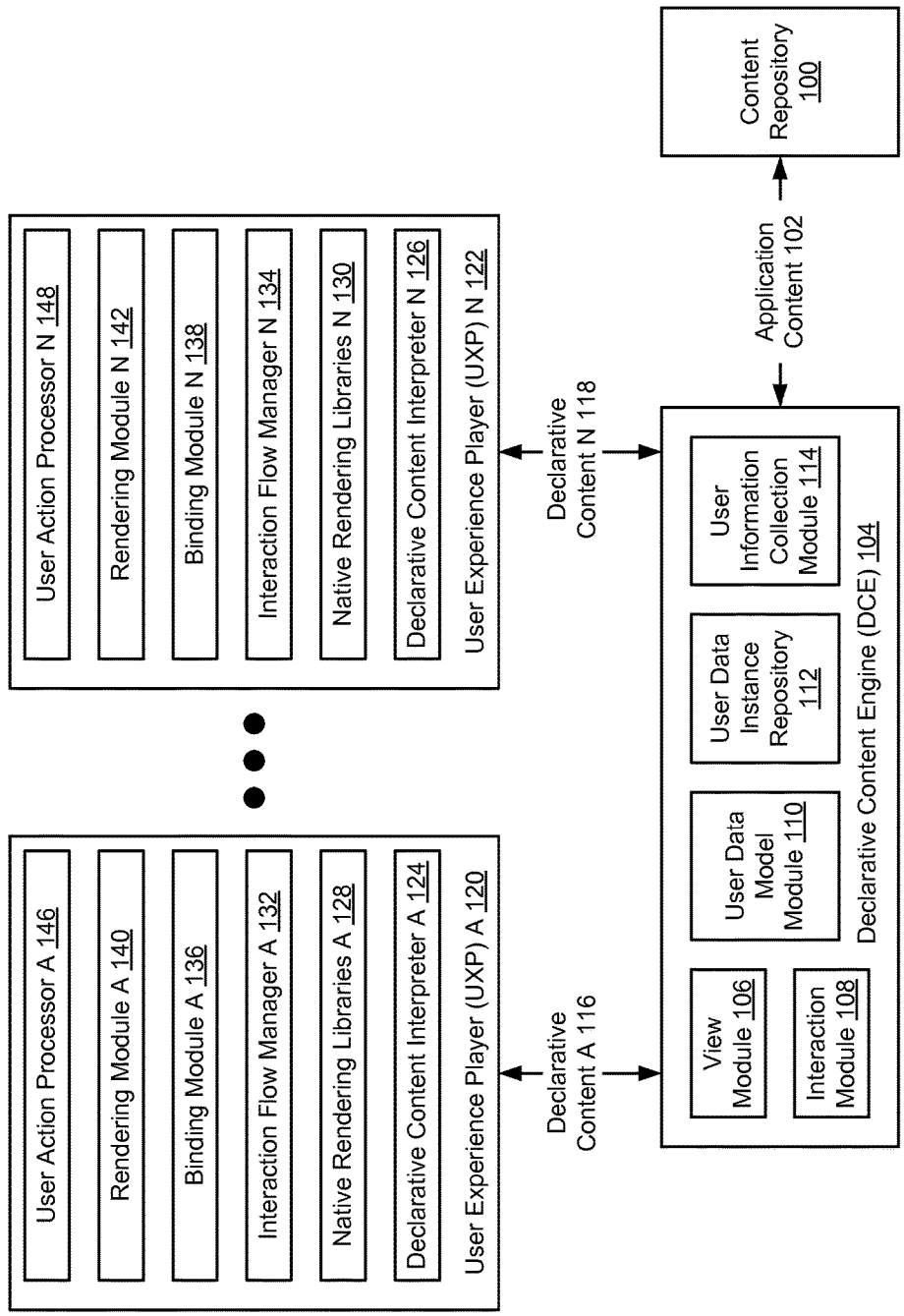
FIG. 1 shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention relate to a method and system for representing application content using a declarative content expression that is common between various types of platforms on which an application may execute. Specifically, in one or more embodiments of the invention, a declarative content engine includes functionality to obtain application content, express the application content as at least a portion of declarative content, and transmit the declarative content to any of a variety of computing device types, each of which may include an execution environment such as an operating system. A computing device combined with execution environment may be referred to as a platform. In one or more embodiments of the invention, each platform type on which an application may execute has a user experience player designed for the platform that is capable of, at least, interpreting the declarative content to obtain the application content. In such embodiments, the user experience player may include functionality to bind the application content to one or more templates and navigation patterns that are native to the platform type on which the user experience player is executing. The application content may then be displayed by the user experience player to a user of the application. In one or more embodiments of the invention, the user of the application takes actions based on being presented the application content, and the user experience player includes functionality to represent the received user actions as declarative content which may be returned to the declarative content engine.

FIG. 1. shows a system in accordance with one or more embodiments of the invention. In one or more embodiments of the invention, the system includes a content repository (e.g., content repository (100)) from which application content (e.g., application content (102)) may be obtained. In one or more embodiments of the invention, the system also includes a declarative content engine (DCE) (e.g., DCE 104) and one or more user experience players (UXPs) (e.g., UXP A (120), UXP N (122)). The DCE (104) may include a view module (e.g., view module (106)), an interaction module (e.g., interaction module (108)), a user data model module (e.g., user data model module (110)), a user data instance repository (e.g., user data instance repository 112), and a user information collection module (e.g., user information collection module (114)). Each UXP (e.g., UXP A (120), UXP N (122)) may include: (i) a declarative content interpreter (e.g., declarative content interpreter A (124), declarative content interpreter N (126)); (ii) one or more native rendering libraries (native rendering library A (128), native rendering library N (130)), (iii) an interaction flow manager (e.g., interaction flow manager A (132), interaction flow manager N (134)), (iv) a binding module (e.g., binding module A (136), binding module N (138)); (v) a rendering module (e.g., rendering module A (140), rendering module N (142)); and (vi) a user action processor (e.g. user action processor A (146), user action processor N (148)). Each of these components is described below.

In one or more embodiments of the invention, the content repository (100) is a data repository for storing, at least in part, application content (e.g., application content (102)). Application content may be content of an application that is executed by a user and may include, but is not limited to, application data for a tax preparation application, a financial transaction application, and/or a loan request application. In one or more embodiments of the invention, a data repository is any type of storage unit and/or device (e.g., a file system, database, collection of tables, or any other storage mechanism) for storing data/information. Specifically, the data repository may include hardware and/or software. Further, the data repository may include multiple different storage units and/or devices. The multiple different storage units and/or devices may or may not be of the same type or located at the same physical site. In one or more embodiments of the invention, the data repository is included as a part of the DCE (104). In other embodiments of the invention, the data repository is a stand-alone repository that is operatively connected to and accessed, at least, by the DCE (104). In one or more embodiments of the invention, the content repository (100) includes functionality to provide application content (102) to at least one DCE (104).

In one or more embodiments of the invention, application content (102) is any data and/or information that is used during execution of an application. Application content (102) may include, but is not limited to, data related what an end-user of the application may see (e.g., questions, answer choices, relevant information, help menu options, etc.), data related to the functioning of the application, data related to the flow of an application (e.g., what application content should be presented next based on user feedback such as an answer to a question), metadata (e.g., type information related to data objects included with the application content), and any other type of data that may be used during execution of an application. Application content (102) may be expressed in any format capable of being read by the DCE (104). For example, application content (102) may be expressed in any computer programming language now known or that may later be developed.

In one or more embodiments of the invention, the application content (102) is obtained from the content repository (100) by the operatively connected DCE (104). In one or more embodiments of the invention, the DCE (104) is any combination of hardware, software, and/or firmware that includes functionality to express obtained application content (102) as declarative content (116) to be sent to a UXP (e.g., UXP A (120), UXP N (122)). For example, the DCE (104) may be a software application executing on a computing device (not shown). In one or more embodiments of the invention, a computing device is any device and/or any set of devices capable of electronically processing instructions and that includes at least the minimum processing power, memory, input and output device(s), network connectivity, and ability to process application content to obtain declarative content to be transmitted to one or more UXPs in order to perform, at least in part, one or more embodiments of the invention. Examples of computing devices include, but are not limited to, a server (e.g., a blade-server in a blade-server chassis), a virtual machine (VM), a desktop computer, a mobile device (e.g., laptop computer, smart phone, personal digital assistant, tablet computer, or other mobile device), any other type of computing device with the aforementioned minimum requirements.

In one or more embodiments of the invention, the DCE (104) is a software application written in any programming language that includes instructions stored in any non-transitory computer readable medium which, when executed by one or more processors in a computing device, enable the computing device to perform the functions described in accordance with one or more embodiments of the invention. In one or more embodiments of the invention, the DCE (104) includes functionality to express application content as declarative content using a declarative programming language (e.g., JavaScript Object Notation (JSON)). In one or more embodiments of the invention, the DCE (104) includes functionality to, at least in part, transmit declarative content to one or more operatively connected (e.g., via computer network (not shown)) UXPs (e.g., UXP A (120), UXP N (122)).

In one or more embodiments of the invention, the DCE (104) includes a view module (106). In one or more embodiments of the invention, a view module (106) is any software, hardware, firmware, and/or combination thereof capable of obtaining view information from the application content and expressing the view information in a declarative programming language. The DCE (104) may also include functionality to interpret view information expressed as declarative content that is received by the DCE (104). View information (not shown) may include information necessary for a logic unit (i.e., a view unit) of presentation but without certain details (e.g., layout, visual control) necessary to render the information. Examples of view information include, but are not limited to, user visible text, data bindings, user action possibilities, hierarchical groupings of artifacts, and semantic relationships between artifacts.

In one or more embodiments of the invention, the DCE (104) includes an interaction module (108). In one or more embodiments of the invention, an interaction module (108) is any software, hardware, firmware, and/or combination thereof capable of obtaining interaction flow and logic information (not shown) and expressing the interaction flow and logic information in a declarative programming language as declarative content. In one or more embodiments of the invention, the interaction module also includes functionality to interpret interaction flow and logic information expressed as declarative content that is received by the DCE (104). Interaction flow and logic information may specify navigation logic, which may be used to determine the next unit of information (e.g., a next view unit) to present to a user of an application upon receiving user actions in response to a current application view (i.e., a current view unit). In one or more embodiments of the invention, the interaction module includes a state machine that is used to model the interaction flow of an application, with nodes representing the view unit, edges representing transitions, and with additional attachments for specifying conditions associated with each transition.

In one or more embodiments of the invention, the DCE (104) includes a user data model module (110). In one or more embodiments of the invention, an user data model module (110) is any software, hardware, firmware, or combination thereof capable of obtaining data model information (not shown) and expressing the data model information in a declarative programming language. In one or more embodiments of the invention, the user data model module (110) also includes functionality to interpret data model information expressed as declarative content that is received by the DCE (104). Data model information may specify the data definition for visible data in a given view unit. In one or more embodiments of the invention, data model information also includes field and/or type information, which may allow a UXP (e.g., UXP A 120) to perform error checks on information entered by a user of an application. In one or more embodiments of the invention, the user data model module (110) may include functionality to use a declarative programming language to express definitions for fields of a view unit. In such an embodiment, the expression of the data model information includes, but is not limited to, an enumeration field that includes all possible enumerated values for a field, the type of the possible values, and validation logic. Such information may allow a UXP to perform various error checks on user actions.

In one or more embodiments of the invention, the DCE (104) includes a user data instance repository (112). In one or more embodiments of the invention, a user data instance repository includes a data repository, similar to the data repository described above, that includes the actual value of user data obtained during a user's use of an application. The user data instance repository (112) may include any software, hardware, firmware, and/or combination thereof capable of obtaining and storing user data instances and both expressing and, in some cases, receiving the user data instances in a declarative programming language (e.g., JSON). In one or more embodiments of the invention, the user data instance repository (112) includes functionality to express user data instances as declarative content which the DCE (104) may transmit to a UXP (e.g., UXP A 120), allowing the UXP to maintain an in-memory client-side data store for managing user data instances as needed for the execution of the application. In one or more embodiments of the invention, the user data instance repository (112) also includes functionality to interpret data instances expressed as declarative content that are received by the DCE (104).

In one or more embodiments of the invention, the DCE (104) includes a user information collection module (114). In one or more embodiments of the invention, a user information collection module (114) is any software, hardware, firmware, and/or combination thereof capable of obtaining user information (not shown) and expressing the user information in a declarative programming language. In one or more embodiments of the invention, the user information collection module (114) also includes functionality to interpret user information expressed as declarative content that is received by the DCE (104). User information may include information related to a given user. User information may also include information related to one or more platforms on which a user executes an application. The user information collection module (114) may include functionality to maintain (e.g., store) user information for one or more users of one or more applications. User information may include user specific information such as profession, age, demographics, user emotional state, complexity of specific user scenario, any other information associated with a user, and/or any combination thereof. User information may also include device information such as platform type (e.g., mobile device, web browser, desktop computer, etc.), operating system type (e.g., iOS, Android, Windows, etc.), and/or device capabilities (e.g., camera, sensors, location awareness, text capabilities, audio capabilities, etc.). In one or more embodiments of the invention, the user information collection module (114) includes functionality to modify the application content requested by the DCE (104) and/or the declarative content provided to a UXP in order to modify the user experience based on the user information. For example, the user experience may be modified by changing the type of information, descriptions of questions, brevity of explanations, available modes of input, etc.

In one or more embodiments of the invention, the DCE (104) transmits declarative content (e.g., declarative content A (116), declarative content N (118)) to one or more UXPs (e.g., UXP A (120), UXP N (122)). In one or more embodiments of the invention, declarative content is content expressed in a declarative programming language. A declarative programming language may generally be used to express the logic of a computation without describing its control flow. Examples of a declarative programming language include, but are not limited to, JSON, structured query language (SQL), Prolog, and Datalog. In one or more embodiments of the invention, declarative content includes application content as well as various other types of information (e.g., interaction flow and logic information) necessary to allow a UXP to render the application content for a user (not shown). In one or more embodiments of the invention, the declarative content includes information expressed in a declarative programming language that is obtained by one or more of the modules and/or repositories included with and/or operatively connected to the DCE (104). Declarative content also includes information expressed in a declarative programming language that is transmitted from a UXP (e.g., UXP A (120), UXP N (122)) to the DCE (104), which may, for example, include information related to user actions and user related information.

In one or more embodiments of the invention, the DCE (104) is operatively connected to one or more UXPs (e.g., UXP A (120), UXP N (122)). The DCE may be operatively connected to the one or more UXPs via a computer network (not shown) such as the Internet. The DCE (104) and the one or more UXPs may be designed to communicate via information expressed in a declarative programming language. In one or more embodiments of the invention, a UXP (e.g., UXP A (120), UXP N (122)) is any software, hardware, firmware, or combination thereof capable of processing declarative content received from a DCE (104), presenting (i.e., rendering) application content to a user, receiving user actions, and transmitting user actions expressed in a declarative programming language to the DCE (104). Interactions between the user of an application and the UXP may occur, at least in part, visually and/or non-visually. Examples of non-visual modes of interaction include, but are not limited to, audio, motion, touch, and electromagnetic. Both the UXP and the user may interact with the other in any of the aforementioned interaction methods. For example, the user may speak words that the UXP processes while the UXP presents information to the user visually. For another example, the UXP may present application content to the user via audio communication while the user communicates with the UXP via eye movement.

In one or more embodiments of the invention, a UXP (e.g., UXP A (120), UXP N (122)) is at least part of a software application written in any programming language that includes instructions stored in any non-transitory computer readable medium which, when executed by one or more processors in a computing device, enable the computing device to perform the functions described in accordance with one or more embodiments of the invention. In one or more embodiments of the invention, a UXP (e.g., UXP A (120), UXP N (122)) is a user interface (UI) module. In one or more embodiments of the invention, the UXP is a part of the application that a user is executing. In other embodiments of the invention, the UXP is a separate module capable of performing actions on behalf of and/or in conjunction with the application that a user is executing.

A UXP (e.g., UXP A (120), UXP N (122)) may be a computer program, or a portion thereof, designed to execute on a certain platform type or group of platform types. For example, a UXP may be designed to execute on a specific device type (e.g., smart phone) on which a specific operating system type (e.g., Android) executes. For another example, a UXP may be designed to execute on any desktop and/or laptop computer that is executing one of a range of Windows based operating systems (i.e., a Windows based platform type). In one or more embodiments of the invention, the UXP (e.g., UXP A (120), UXP N (122)) executes on any type of computing device, substantially similar to the computing devices described above in relation to the DCE (104). The UXP (e.g., UXP A (120), UXP N (122)) may include functionality to present application content to a user visually (e.g., presenting a graphical user interface (GUI)). In one or more embodiments of the invention, the UXP (e.g., UXP A (120), UXP N (122)) includes functionality to present application content in any non-visual way that is supported by the platform on which the UXP executes. For example, the UXP may include functionality to render application content in ways including, but not limited to, via audio, via a text-based interface (e.g., short message service (SMS) text), via braille, and/or via a virtual reality based interface.

In one or more embodiments of the invention, the UXP (e.g., UXP A (120), UXP (122)) includes a declarative content interpreter (e.g., declarative content interpreter A (124), declarative content interpreter N (126)). In one or more embodiments of the invention, a declarative content interpreter (e.g., declarative content interpreter A (124), declarative content interpreter N (126)) is any software, hardware, firmware, and/or combination thereof capable of interpreting (i.e., processing) declarative content received from a DCE (104) in order to obtain application content and related information (e.g., interaction flow and logic information, data model information, etc.), which may be referred to as interpreted content. In one or more embodiments of the invention, the declarative content interpreter (e.g., declarative content interpreter A (124), declarative content interpreter N (126)) also includes functionality to express information (e.g., information related to a user's actions) in a declarative programming language before it is transmitted to the DCE (104). In one or more embodiments of the invention, the declarative content interpreter is a module that is common amongst all UXPs, or a portion thereof, meaning that the various UXPs all include a common portion that is the declarative content interpreter. In other embodiments of the invention, the declarative content interpreter may differ between two or more UXPs.

In one or more embodiments of the invention, the UXP (e.g., UXP A (120), UXP N (122)) includes one or more native rendering libraries (e.g., native rendering libraries A (128), native rendering libraries N (130)). As used in this context, a library is a collection of information, behaviors, and/or subroutines with defined interfaces that may be used by any appropriately configured software executing on a platform that includes the library. In one or more embodiments of the invention, a native rendering library (e.g., native rendering libraries A (128), native rendering libraries N (130)) is a library in which exists information that allows the UXP (e.g., UXP A (120), UXP N (122)) to render application content on a specific platform on which the UXP and user executed application are executing. For example, a native platform library may include one or more native templates specific to the operating system, web browser, and/or computing device hardware on which the UXP executes. In such an example, the one or more templates may include, but are not limited to, information related to visual and/or non-visual presentation of information as well as navigation patterns and actuators (e.g., buttons to press, drop down lists for selecting from, defined meanings for user swipe actions, etc.). In one or more embodiments of the invention, more than one native library, each including differing native templates and navigation patterns, allows the UXP to render an application differently to a user on the same platform.

In one or more embodiments of the invention, the UXP (e.g., UXP A (120), UXP N (122)) includes an interaction flow manager (e.g., interaction flow manager A (132), interaction flow manager N (134)). In one or more embodiments of the invention, an interaction flow manager (e.g., interaction flow manager A (132), interaction flow manager N (134)) is any software, hardware, firmware, and/or combination thereof capable of executing various aspects of a user's interaction with an application based, at least in part, on the received interaction flow and logic information and various user actions.

In one or more embodiments of the invention, the UXP (e.g., UXP A (120), UXP N (122)) includes a binding module (e.g., binding module A (136), binding module N (138)). In one or more embodiments of the invention, a binding module (e.g., binding module A (136), binding module N (138)) is any software, hardware, firmware, and/or combination thereof capable of binding platform-native visual and/or non-visual templates and navigation patterns (i.e., of the aforementioned one or more native rendering libraries) with the declarative content (including application content therein) to be presented to a user as a view unit.

In one or more embodiments of the invention, the UXP (e.g., UXP A (120), UXP N (122)) includes a rendering module (e.g., rendering module A (140), rendering module N (142)). In one or more embodiments of the invention, a rendering module (e.g., rendering module A (140), rendering module N (142)) is any software, hardware, firmware, and/or combination thereof capable of rendering the view unit bound by the binding module (e.g., binding module A (136), binding module N (138)) to a user of an application. The rendering may include visual aspects, non-visual aspects, or a combination thereof.

In one or more embodiments of the invention, the UXP (e.g., UXP A (120), UXP N (122)) includes a user action processor (e.g., user action processor A (146), user action processor N (148)). In one or more embodiments of the invention, a user action processor (e.g., user action processor A (146), user action processor N (148)) is any software, hardware, firmware, and/or combination thereof capable of, at least, handling user actions, updating one or more local data stores, and performing view unit refresh actions.

While FIG. 1 shows a configuration of components, other configurations may be used without departing from the scope of the invention. For example, various components may be combined to create a single component. As another example, the functionality performed by a single component may be performed by two or more components. In one or more embodiments of the invention, one or more of the modules and elements shown in FIG. 1 may be omitted, repeated, and/or substituted. For example, there may be more than one declarative content engine. For another example, there may be any number of user experience players operatively connected to each declarative content engine. Accordingly, embodiments of the invention should not be considered limited to the specific arrangements of modules and elements shown in FIG. 1.

Figure 2:
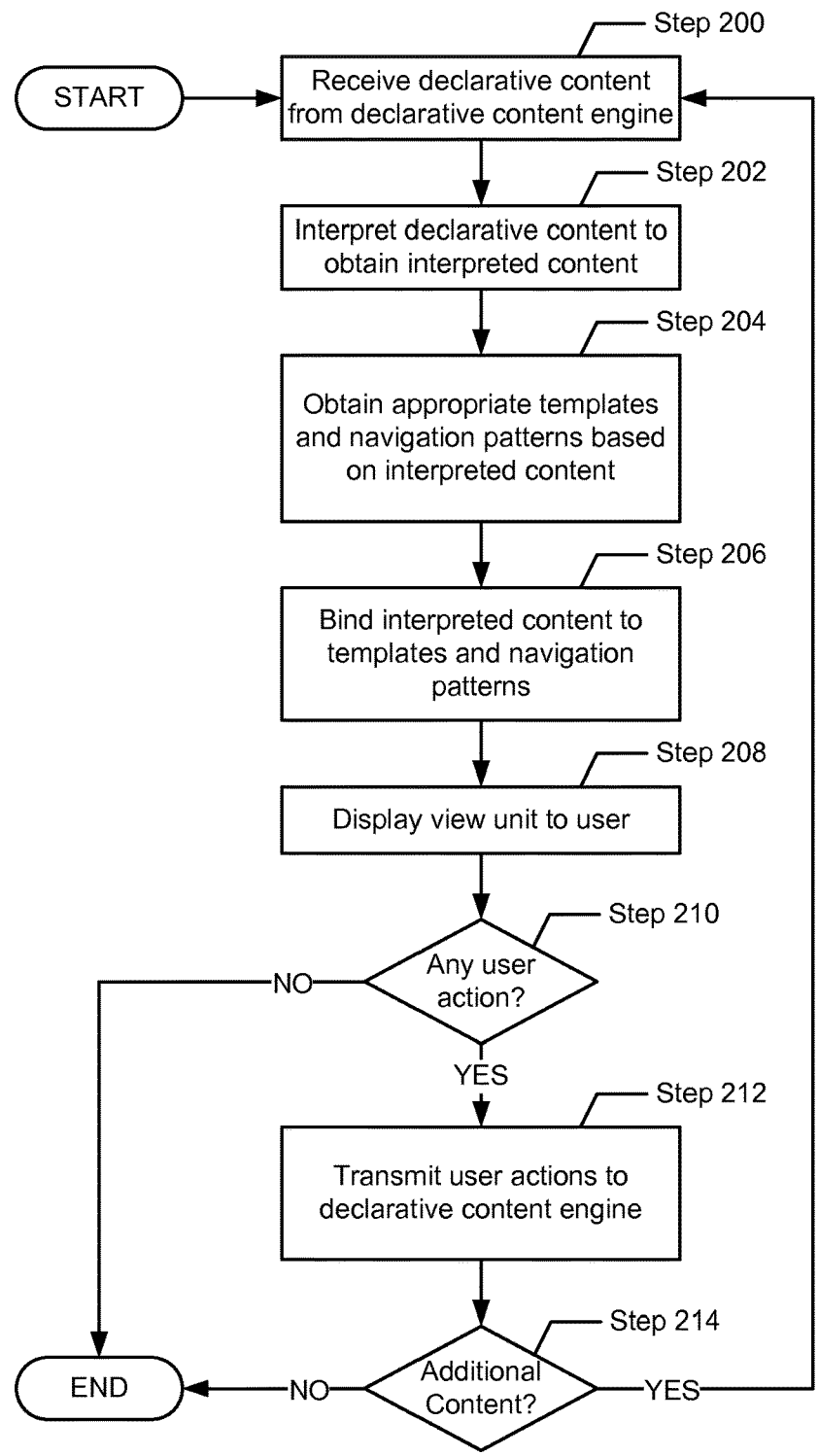
FIG. 2 shows a flowchart in accordance with one or more embodiments of the invention.

FIG. 2 shows a flowchart in accordance with one or more embodiments of the invention. While the various steps in these flowcharts are presented and described sequentially, one of ordinary skill in the art will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention.

FIG. 2 shows a flowchart describing a method for processing declarative content from a declarative content engine and rendering application content for a user of an application. In Step 200, declarative content is received at a UXP from a DCE. Declarative content may be expressed in any declarative programming language (e.g., JSON). In one or more embodiments of the invention, the received declarative content includes application content as well as additional related content (e.g., interaction flow and logic information). In one or more embodiments of the invention, the declarative content is received from an operatively connected declarative content engine. For example, the UXP may be executing on a tablet device that is operatively connected to the server on which the DCE executes via a series of wireless and wired networks.

In Step 202, the declarative content is interpreted. In one or more embodiments of the invention, the declarative content is interpreted by a declarative content interpreter, which may be a portion of the UXP. In one or more embodiments of the invention, interpretation of the declarative content includes, but is not limited to, parsing the received declarative content in order to obtain the application content and related content included therein. In one or more embodiments of the invention, interpreting the declarative content also includes making the interpreted content available for use by the other portions of the UXP.

In Step 204, the UXP obtains appropriate templates and navigation patterns based on the interpreted content. In one or more embodiments of the invention, the templates and navigation patterns, which may be visual and/or non-visual, are obtained from one or more native rendering libraries included with and/or operatively connected to the UXP.

In Step 206, the relevant portion of the interpreted content is bound to the one or more templates and navigation patterns obtained in Step 204. In one or more embodiments of the invention, a binding module of the UXP performs the binding. Binding content to templates and navigation patterns may include creating a relationship between portions of the interpreted content and the templates and navigation patterns in order to prepare the content as a view unit for presentation to a user.

In Step 208, a view unit is rendered for a user. In one or more embodiments of the invention, rendering a view unit includes displaying application content to a user of an application. In one or more embodiments of the invention, a rendering module of the UXP includes functionality to render content that has been bound, as in Step 206, to templates and navigation patterns. The rendered view unit may be visual, non-visual, or any combination thereof. For example, a rendered view unit may be a visual presentation of a screen of a tax preparation application. In such an example, the rendered view unit may include, but is not limited to, text, graphics, fields for entering user information, questions to be answered by a user, fields for a user to enter answers to presented questions, actuating buttons for user selections, drop down menus for user selection, or any other information relevant to the tax preparation application that is to be rendered to a user.

In Step 210, a determination is made as to whether any user action was taken in response to the display of the view unit. For example, a user may enter personal data, answer a question, make a selection, press a button, speak a help query, gesture to indicate an answer, switch platforms, change desired mode of interaction (e.g., from visual to non-visual), decide to save and/or pause the application, and/or any other possible form of user action. User actions may be actuated by any means supported by the platform on which a user executes an application that operates in conjunction with a UXP. For example, user action may include, but is not limited to, keyboard input, mouse input, audio input, motion input, and touch input. For another non-limiting example, electromagnetic input may be received from a user via one or more electrodes. User action may be actuated through any form of biometric input. For example, fingerprints and/or eye movements may be used to input a user action. User action may additionally be actuated by any peripheral device that is operatively connected to the platform. For example, glasses or contact lenses may be operatively connected to the platform and used to actuate the receipt of user responses to questions and/or for a user to enter user information into fields of an application. Such a user action may be in response to the view unit rendered and/or may be any other chosen user action supported by the application that the user is executing. In one or more embodiments of the invention, there is a timeout period associated with a given view unit during which a UXP will wait for a user action. In one or more embodiments of the invention, the application will not move forward unless a user action occurs. If one or more user actions occur, then the process moves to Step 212. If a user action does not occur, then the process proceeds to end.

Turning to Step 212, the one or more user actions are transmitted from the UXP to the DCE. In one or more embodiments of the invention, the user actions are expressed in a declarative programming language. For example, the user actions may be expressed as a JSON response. In one or more embodiments of the invention, the transmission of the user action(s) occurs over a network and/or a collection of one or more interconnected networks (e.g., the Internet).

In Step 214, a determination is made as to whether additional declarative content is to be transmitted from the DCE to the UXP that transmitted the user actions. Additional content may be required in response to any user action, in response to a user error, in order to advance through the application, and/or in response to a timeout. Additional content may include, but is not limited to, additional application content, a next view unit, additional interaction flow and logic information, additional data model information, additional data instances, and/or additional user information. If there is no additional content, the process proceeds to end. If there is additional content, the DCE prepares additional declarative content and the process returns to Step 200.

Figure 3:
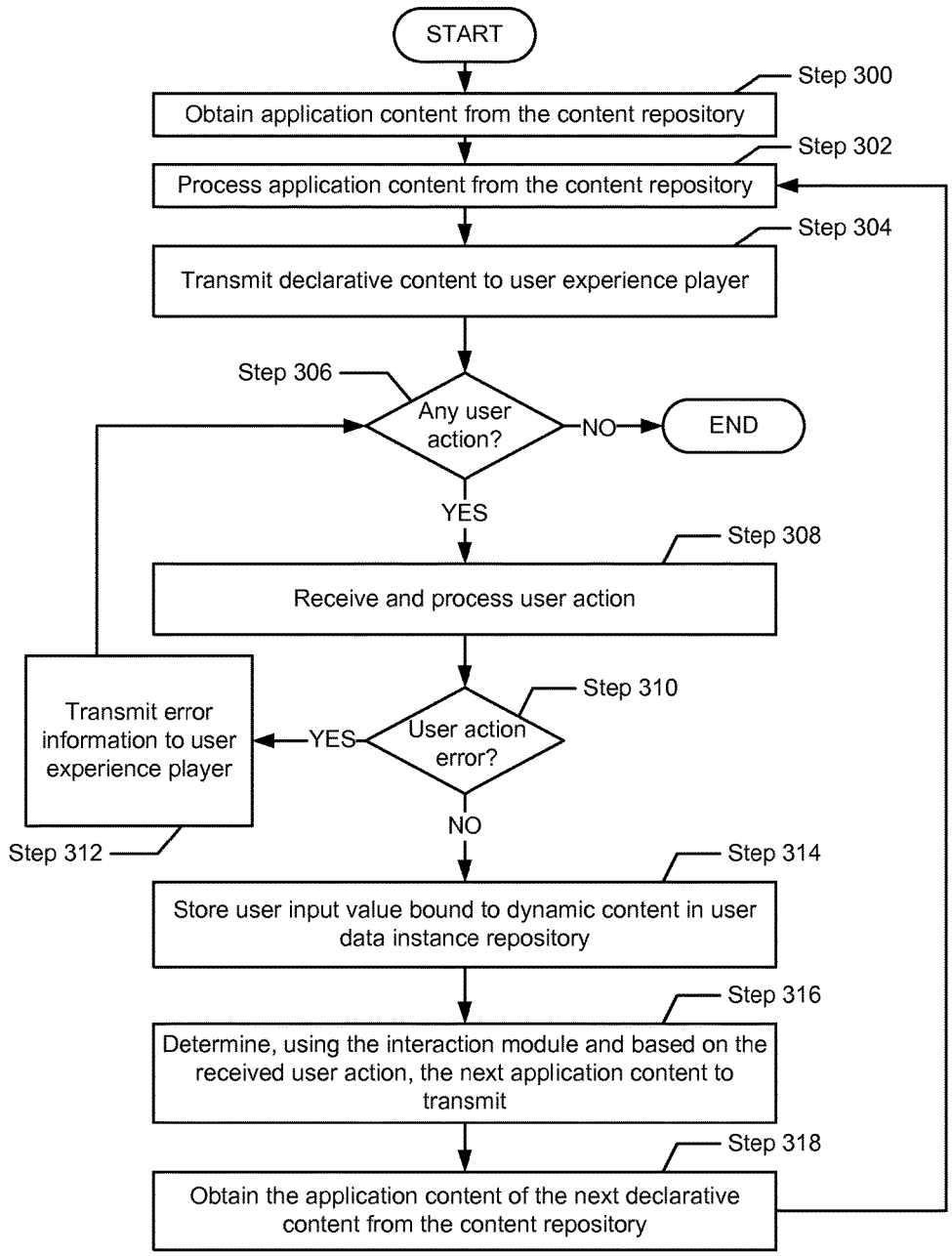
FIG. 3 shows a flowchart in accordance with one or more embodiments of the invention.

FIG. 3 shows a flowchart describing a method for providing declarative content from a DCE to at least one UXP. In Step 300, application content is obtained by a DCE from an operatively connected and/or included content repository that stores application content. In one or more embodiments of the invention, the application content is obtained in order to initiate an application, in response to one or more user actions, and/or any other reason relevant to the execution of the DCE and/or the application being executed by a user.

In Step 302, the application content is processed by the DCE. In one or more embodiments of the invention, the application content is processed to obtain at least part of the declarative content for transmitting a view unit to a UXP. In one or more embodiments of the invention, processing the application content includes generating and/or obtaining additional content that is to be expressed as declarative content along with the application content. In such embodiments of the invention, additional content may include, but is not limited to, interaction flow and control information, data model information, data instance information, and/or user related information.

In Step 304, the application content and additional content obtained and expressed as declarative content in Step 304 is transmitted to a UXP from the DCE. In one or more embodiments of the invention, the DCE is operatively connected to at least one UXP. For example, the DCE may be executing on a server that is connected via a computer network to one or more clients on which a UXP executes. Transmission of the declarative content may include using the network functionality of the computing device on which the DCE executes in order to appropriately package the declarative content for transmission over a network.

In Step 306, a determination is made as to whether any user action has occurred. In one or more embodiments of the invention, a user action is determined to have occurred when a UXP transmits one or more user actions expressed as declarative content to the DCE. In other embodiments of the invention, the user action(s) may be expressed in any way that the DCE is capable of receiving. If a user action occurs and declarative content expressing the user action is received by the DCE, the process moves to Step 306. If no user actions occur, the process proceeds to end.

Turning to Step 308, the user action is received and processed by the DCE. In one or more embodiments of the invention, the user action(s) arrives expressed as declarative content. User actions may have occurred in response to the declarative content transmitted in Step 304 and/or for any other reason relevant to a user's use of an application. In one or more embodiments of the invention, the received user action(s) are processed by the DCE. In one or more embodiments of the invention, processing the user action(s) includes evaluating the actions in order to determine what action, if any, should be taken next by the DCE. For example, the user action may have included an input value, which is stored, and an answer to a question, which may dictate, at least in part, the interaction flow and subsequent application content to be expressed as declarative content and transmitted to the UXP. For another example, the user action may have been to switch platforms, in which case the DCE's next transmission of declarative content will be sent to the new platform. For another example, the user may desire to switch application context, such as from non-visual to visual, in which case the next transmission of declarative content from the UXP would reflect the user's preference change.

Turning to Step 310, a determination is made as to whether the user action was an error. In one or more embodiments of the invention, the UXP includes functionality to determine if the user action created and/or was an error. In such embodiments of the invention, the declarative content received by the DCE from the UXP will include information related to one or more errors derived from a user's action(s). In other embodiments of the invention, the DCE includes functionality to determine, based on the received and processed user action information, if an error has occurred. If a user action error has occurred, the process moves to Step 312. If no user action error has occurred, then to process moves to Step 314.

Turning to Step 312, information related to an error is transmitted as declarative content to a UXP. In one or more embodiments of the invention, the DCE may obtain information related to the error, based on the user action error, and express the error information as at least part of additional declarative content. In one or more embodiments of the invention, the declarative content including the error information is transmitted to the UXP in order to be conveyed, at least in part, to the user of an application in which the error occurred. After the error information is transmitted from the DCE to the UXP, the process returns to Step 304 in order to wait for additional user action(s).

Returning to Step 314, any user input values included in the declarative content received by the DCE from the UXP are bound to dynamic content in the user data instance repository. In one or more embodiments of the invention, the user data instance repository stores, at least, a record of user input values bound to related dynamic content. The record may allow, for example, one or more UXPs to retrieve the user input information for later use by the application.

In Step 316, the DCE determines the next application content to be transmitted as a portion of a declarative content transmission. In one or more embodiments of the invention, the DCE uses, at least, the interaction module and the received user action in order to determine what application content is needed next.

In Step 318, the DCE obtains the next application content from the content repository. In one or more embodiments of the invention, the DCE requests the application content determined in Step 316 to the relevant next application content to be transmitted to the UXP. After the next application content is obtained by the DCE, the process returns to step 302, after which the next application content is processed and ultimately transmitted to a UXP as at least a portion of a next declarative content.

Figure 4:
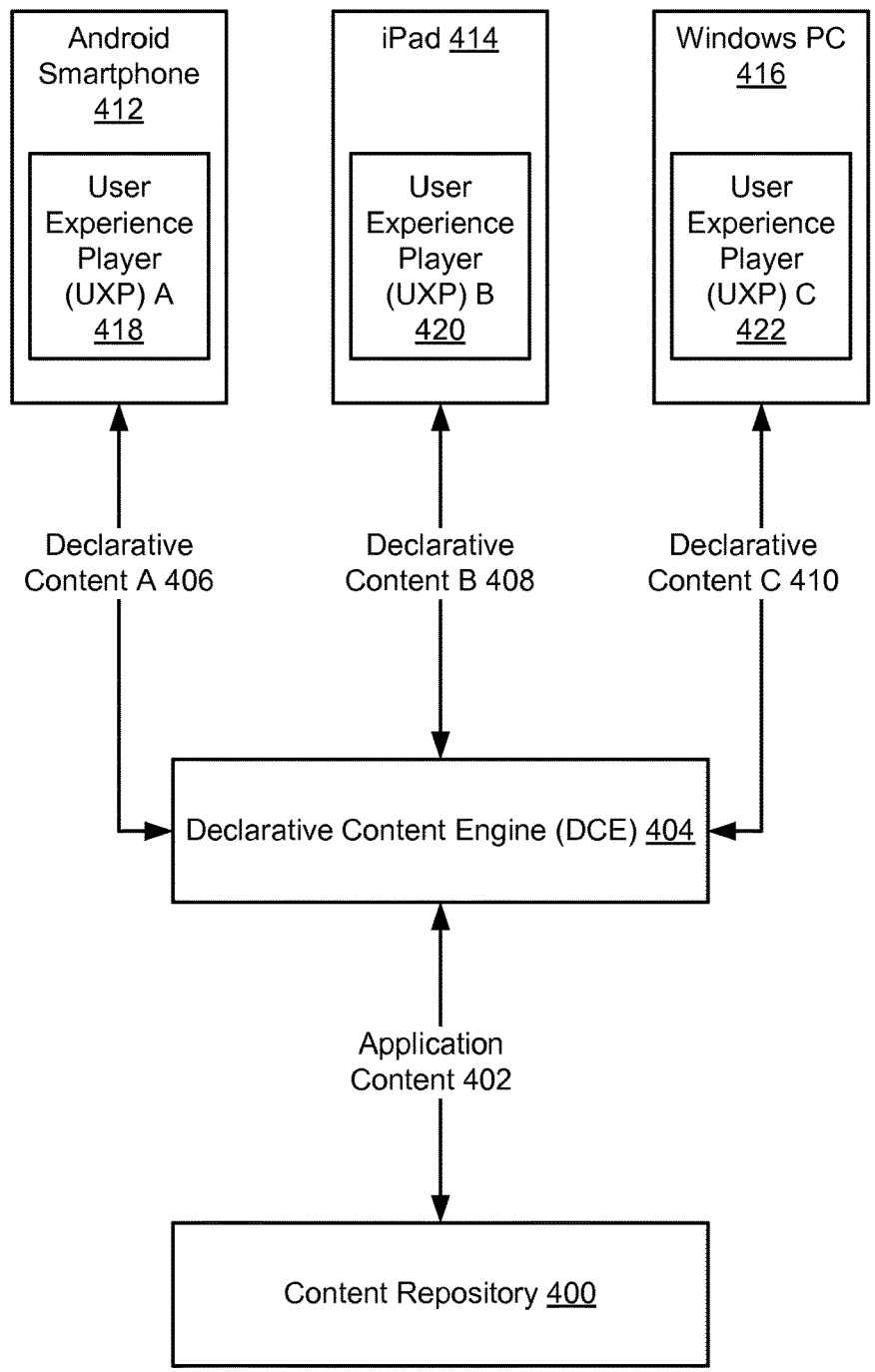
FIG. 4 shows an example in accordance with one or more embodiments of the invention.

FIG. 4 shows an example in accordance with one or more embodiments of the invention. The following example is for explanatory purposes only and not intended to limit the scope of the invention.

Referring to FIG. 4, consider a scenario in which a declarative content engine (DCE) (404) is operatively connected to a content repository (400). The DCE is also operatively connected to three platforms (i.e., three client devices). The first platform is an Android-based smartphone (412) on which UXP A (418) is executing. The second platform is an iPad (414) on which UXP B (420) is executing. The third platform is a Windows personal computer (PC) (416) on which UXP C (422) is executing. Each of the three platforms is being used by a different user (not shown) to execute a tax return preparation application, with which the UXP executes in conjunction. Between the content repository and the DCE, a conduit exists for transmitting application content (402). Although only one such conduit is shown in the example, there may be as many as necessary in order to perform aspects of the invention. The conduit maybe, for example, a connection between a server and a storage device. Each of the three platforms is connected to the DCE via the Internet (not shown).

The tax return preparation application being used by each user necessarily includes a series of events in which information relevant to a tax return of a user is obtained from the user. One screen in the series of screens for obtaining information from a user of the tax return preparation application is a screen in which the user is asked what portion of the previous year the user maintained health insurance. Possible responses include: (i) "Had health insurance all year"; (ii) "Had no health insurance"; and (iii) "Had health insurance for part of the year". The question and each of the three possible answer choices are presented to each user when that user encounters the appropriate portion of the tax return preparation application. The DCE expresses this content, as well as related content, as declarative content to be transmitted to the UXP of each user's platform whenever that user requires the view unit that includes the question and answer choices.

To that end, the DCE first obtains relevant application content from the content repository. The DCE then processes the application content along with any other relevant factors in order to obtain the various pieces of declarative content to be transmitted to a UXP. The DCE may perform the action of obtaining the application data whenever one of the user's reaches the appropriate portion of the application flow.

The declarative content obtained by the DCE includes view content, which includes metadata (to indicate the type of the unit of display ("Q&A")), title (with text content), and fields (collection of multiple fields). In this example, there is a single field, with type "choice" and three "choices". View data may also include information related to binding (data field to set the value upon selection) and (actions) (navigation actions (Next and Prev) are included). The view information portion of the declarative content may be expressed as follows:

```
{ "metaData": {"type": "Q&A", "id", "ACACoverage"}
    "title": { "asset": "How long did you have health insurance in 2014?"},
    "fields": [
        { "type": "choice",
            "choice": [
                    { "label": { "asset": "Had health insurance all year"},
                        "value": "HadFullYearPlan" },
                    { "label": { "asset": "Had no health insurance"},
                        "value": "HadNoPlan" },
                    { "label": { "asset": "Had health insurance part of the year"},
                        "value": "HadPartYearPlan"}],
            "binding":
"Return.ReturnData.IRS1040ScheduleACA.CoverageIndPP"
        }],
    "actions": [
        { "label": { "asset": "Continue"},
            "value": "Next"}
        { "label": {"asset": "Back"},
"value": "Prev"} ] }
```

The declarative content obtained by the DCE also includes interaction flow and logic content, which may be expressed as follows:

```
"ACASingleFlow": {
    "startState": "VIEW node",
    "VIEW node": {
```

-continued

```
    "state type": "VIEW",
    "ref"": "ACACoverage",
    "transitions": {
        "Next": "END done"
    }
    },
    "END done": {
        "state type": "END",
        "outcome": "doneWithFlow"
    }
}
```

The declarative content obtained by the DCE also includes data model information, which may be expressed as follows:

```
{
    "IRS1040ScheduleACAType": {
        "CoverageIndPP": {
            "type": "EnumType",
            "validation": [
                {"message": "Please select one of the options",
                    "type": "required" } ],
            "enum": ["HadFullYearPlan", "HadPartYearPlan","HadNoPlan"],
            "default": ""
        },
        "SubsidyEligibleAmtPP": {
            "type": "USAmountNNType",
            "default": ""
        } }
```

The above examples of declarative content expressions are sent to a UXP any time a user reaches the appropriate point in the application where the aforementioned question is to be asked of the user.

On the client side, a UXP executes on a user's platform (e.g., the Android smartphone (412), the iPad (414) and/or the Windows PC (416)). When the declarative content is received from the DCE by a UXP, a declarative content interpreter interprets the declarative content. Next, the UXP obtains, from one or more native rendering libraries, visual templates and navigation patterns that are specific to the platform on which the UXP executes. Content to be displayed to the user of the application (i.e., the question and the corresponding answer options) is then bound to the visual templates and navigation patterns and displayed to the user. The display of the content, as viewed by the user, may be different on each platform type. Each platform type has a different set of capabilities and functionality, therefore each user experience may differ (e.g., be optimized) for a given platform based on the platform characteristics.

For example, the Android smartphone user may see a visual representation of the application background, the question written in a first font, and each of the answer choices listed next to a circle which a user may select to select the corresponding answer choice. The iPad user's UXP receives the same declarative content as was received by the UXP of the Android smartphone in the previous example. However, the iPad user has a different user experience that includes a visual representation of the application background, the questions rendered in a second font, and three large buttons. Each of the three buttons includes one of the three answer options, requiring the user to "press" one of the three buttons using some form of cursor control mechanism (e.g., mouse, trackball, touchpad, audio control device, etc.). The Windows PC user's UXP receives the same declarative content as was received by the UXP of the Android smartphone and the iPad in the previous examples. However, the Windows PC user has a different user experience which includes a visual representation of the application background, the question being rendered in a third font, and a field for which a drop down menu exists which includes the three answer options.

In this example, the user in each case has had insurance coverage for the entirety of the previous year. Accordingly, each select the answer option indicating that insurance was maintained for the full previous year. Therefore, the UXP for each prepares a response to send to the DCE that includes the response to the question. The response is expressed as declarative content and may appear as follows:

```
{
    "IRS1040ScheduleACA": {
        "CoverageIndPP": "HadFullYearPlan",
        "SubsidyEligibleAmtPP ": "4750",
    }
}
```

This content represents a user data instance and may be bound by the DCE with dynamic content related to each user, respectively and stored in the user data instance repository.

In the above described example, three entirely different platforms, each executing a UXP, received the same declarative content from the DCE. However, the application, or portion thereof (in this case the view unit for the question regarding previous year's insurance), is rendered differently on each platform based, at least in part, on the native capabilities of the platform on which the UXP executes.

Figure 5:
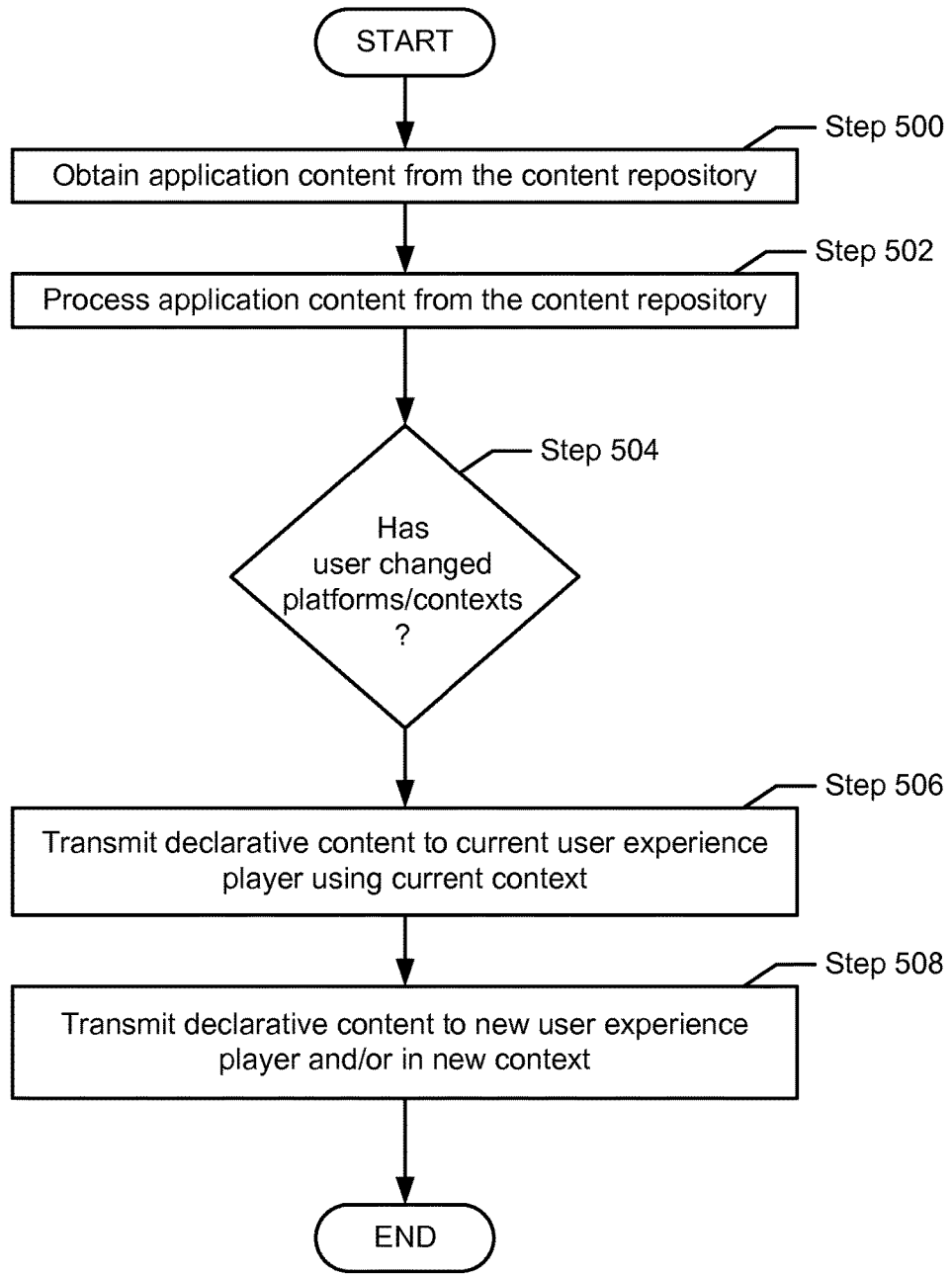
FIG. 5 shows a flowchart in accordance with one or more embodiments of the invention.

FIG. 5 is a flowchart that demonstrates an exemplary embodiment of the invention in which a user switches from a first platform while progressing through an application and/or in which a user switches from a first context to a second context. Steps 500 through 502 of FIG. 5 are substantially similar to Steps 300 through 302 of FIG. 3.

In Step 504, a determination is made as to whether a user has switched platforms and/or contexts. A user may decide to move from a first platform on which the user is executing an application to a second platform on which the user wants to execute the same application. The determination may be made explicitly, via a UXP of the first platform and/or the second platform informing the DCE of the user move. The determination may also be made implicitly, with the DCE detecting the platform change. The user may also or alternatively decide to switch contexts. For example, a user who has been interacting with the application in an audio context while driving a car may decide to switch to a visual context upon arriving at home. If a determination is made that a user has decided to switch platforms, contexts, and/or any combination thereof, the process moves to Step 508. If no switch has been made by the user, the process proceeds to Step 506 and the declarative content is transmitted to the current platform and/or context.

Turning to Step 508, if the user has switched platforms, then the declarative content is transmitted to a new UXP on which the user wants to continue executing the application. In one or more embodiments of the invention, the new UXP may be executing on a different platform type, and therefore the user experience changes to correspond to the new platform. If the user as additionally and/or alternatively decided to switch contexts, then the declarative content is modified to reflect the new user-desired context. In one or more embodiments of the invention, the DCE may modify (e.g., optimize) the declarative content for the new context.

In such embodiments of the invention, the modification may be based, at least in part, on the platform capabilities related to the desired context.

In the exemplary embodiment of the invention described in the flowchart of FIG. 5, the determination of the change may occur after new content has been obtained and expressed as declarative content to be transmitted to a UXP. However, the invention may also include functionality to detect a change before determining and obtaining new declarative content to transmit. In such embodiments of the invention, the previously rendered content (i.e., previously presented to the user on the first platform and/or in the first context before a switch happens) is expressed as modified declarative content and transmitted to the UXP to be rendered on the new platform and/or in the new context.

An additional exemplary embodiment of the invention includes a declarative content filter. In such an embodiment of the invention, the DCE may include an intelligent asset loader that includes functionality to filter declarative content based on variability tags. Variability tags may include, but are not limited to, platform type, (e.g., mobile, desktop, web browser, etc.) form factor (e.g., small, medium, large, etc.), device capabilities (e.g., camera, available sensors, location sensing, etc.), language preferences (e.g., English, Spanish, etc.), user profile information (e.g., profession, age, demographics, etc.), user emotional state, complexity of user scenario, and/or any combination thereof.

In an additional exemplary embodiment of the invention, the DCE may be used in order to conduct, at least in part, A-B testing. A-B testing is testing in which a user is presented with two different options (e.g., an "A" option and a "B" option) and selects one of the two as the preferred option. The selection of the preferred option may be provided to the DCE, which includes functionality to receive the user's selection. The DCE may also include functionality to collect such information from any number of users who are making A vs. B decisions on any number of potential view units delivered to a UXP from a DCE. Such embodiments of the invention may allow for scalable A-B testing of applications rendered by UXPs of the invention.

In an additional exemplary embodiment of the invention, the DCE includes additional functionality to create an application shell that manages, at least in part, at least two applications executing on two separate platforms, but that are being used by the same user. In such embodiments of the invention, a user may be moving between platforms and therefore the application shell maintains the necessary data to allow each individual application to remain current in the interaction flow and with the latest user entered information as the user moves platforms. For applications such as tax preparation applications, a user may take a considerable amount of time in order to complete a given tax return. Accordingly, the application shell provides the user the capability of moving between devices. The application shell may serve as a master controller to manage the launch and switch of different UXPs, handle cross-communication between the UXPs and orchestrate user interaction among the different UXPs.

In an additional exemplary embodiment of the invention, the DCE includes additional functionality to monitor various user data such as, for example, user interaction speed, scenario complexity, network connection speed, and network connection reliability. In one or more embodiments of the invention, the DCE includes functionality to use the user information in order to predict possible future workflows and to decide which and how much potential future content to pre-fetch to client devices on which an operatively connected UXP is executing.

Figure 6:
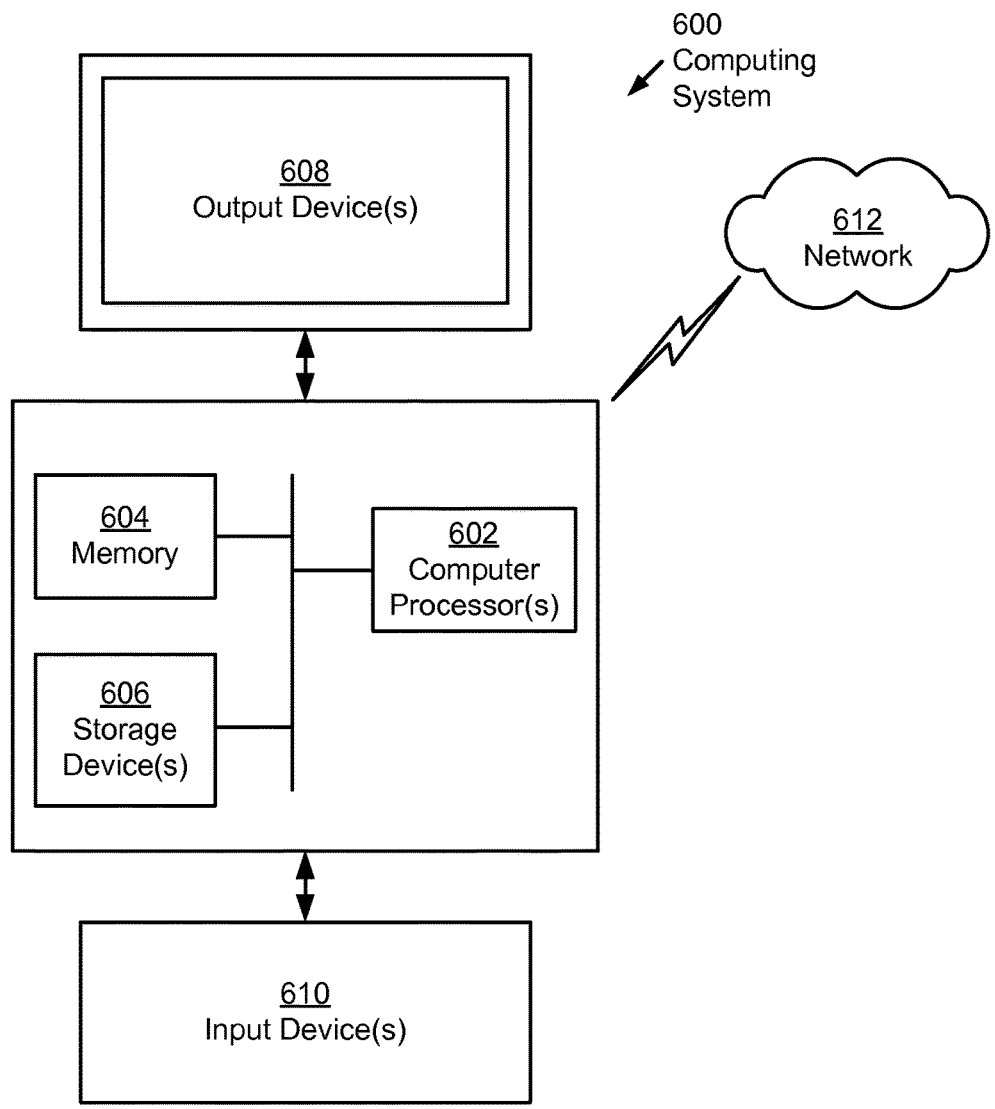
FIG. 6 shows a computing system in accordance with one or more embodiments of the invention.

Embodiments of the invention may be implemented on virtually any type of computing system regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 6, the computing system (600) may include one or more computer processor(s) (602), associated memory (604) (e.g., random access memory (RAM), cache memory, flash memory, etc.), one or more storage device(s) (606) (e.g., a hard disk, an optical drive such as a compact disk (CD) drive or digital versatile disk (DVD) drive, a flash memory stick, etc.), and numerous other elements and functionalities. The computer processor(s) (602) may be an integrated circuit for processing instructions. For example, the computer processor(s) may be one or more cores, or micro-cores of a processor. The computing system (600) may also include one or more input device(s) (610), such as a touchscreen, keyboard, mouse, microphone, touchpad, electronic pen, or any other type of input device. Further, the computing system (600) may include one or more output device(s) (608), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (600) may be connected to a network (612) (e.g., a local area network (LAN), a wide area network (WAN) such as the Internet, mobile network, or any other type of network) via a network interface connection (not shown). The input and output device(s) may be locally or remotely (e.g., via the network (612)) connected to the computer processor(s) (602), memory (604), and storage device(s) (606). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (600) may be located at a remote location and connected to the other elements over a network (612). Additionally, embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for providing application content of an application comprising:
   obtaining, by a declarative content engine executing on a computer processor, an initial application content from a content repository;
   expressing the initial application content in a declarative programming language to obtain initial declarative content;
   transmitting the initial declarative content to a first user experience player of a first platform of a first platform type, wherein the first user experience player:
   interprets the initial declarative content to obtain initial interpreted content,
   obtains, based on the initial interpreted content, first platform-specific templates and first platform-specific navigation patterns for the first platform type, the first platform-specific templates comprising a first presentation of information and first user interface controls,
   binds a portion of the initial interpreted content to the first platform-specific templates and the first platform-specific navigation patterns, and
   renders the portion of the initial interpreted content in a first platform-specific user display format;
   receiving a user action of a user executing the application from the first user experience player in response to the transmission of the initial declarative content;
   storing the user action associated with the initial declarative content in a user data instance repository;
   receiving a request from the user to continue executing the application on a second platform of a second platform type;
   determining, using an interaction module and the stored user action, a next application content based on the stored user action;
   obtaining the next application content from the content repository;
   expressing the next application content in the declarative programming language to obtain a next declarative content; and
   transmitting the next declarative content to a second user experience player of the second platform, wherein the second user experience player:
   interprets the next declarative content to obtain a next interpreted content,
   obtains, based on the next interpreted content, second platform-specific templates and second platform-specific navigation patterns for the second platform type, the second platform-specific templates comprising a second presentation of information and second user interface controls,
   binds a portion of the next interpreted content to the second platform-specific templates and the second platform-specific navigation patterns, and
   renders the portion of the next interpreted content in a second platform-specific user display format for the second platform type.

2. The method of claim 1, further comprising:
   detecting an error in the user action;
   transmitting information related to the error to the first user experience player; and
   receiving, in response to the transmitted information, an updated user action.

3. The method of claim 1, wherein the initial application content comprises application information comprising view information, interaction flow information, data model information and user data information.

4. The method of claim 1, wherein the initial application content is at least a portion of one selected from a group consisting of a tax preparation application, a financial transaction application, and a loan request application.

5. The method of claim 1, wherein the initial declarative content is expressed in JavaScript Object Notation.

6. A system for providing application content of an application comprising:
   a computer processor;
   a memory;
   a declarative content engine executing on the computer processor and configured to: obtain an initial application content from a content repository;
   express the initial application content in a declarative programming language to obtain initial declarative content;
   transmit the initial declarative content to a first user experience player of a first platform of a first platform type;
   receive a user action of a user executing the application from the first user experience player in response to the transmission of the initial declarative content;
   store the user action associated with the initial declarative content in a user data instance repository;
   receive a request from the user to continue executing the application on a second platform of a second platform type;
   determine, using an interaction module and based on the stored user action, a next application content based on the stored user action;
   obtain the next application content from the content repository;
   express the next application content in the declarative programming language to obtain a next declarative content; and
   transmit the next declarative content to a second user experience player of the second platform,
   wherein the first user experience player is configured to:
   receive declarative content from the declarative content engine;
   interpret the initial declarative content to obtain initial interpreted content;
   obtain, based on the initial interpreted content, first platform-specific templates and first platform-specific navigation patterns for the first platform type, the first platform-specific templates comprising a first presentation of information and first user interface controls;
   bind a portion of the initial interpreted content to the first platform-specific templates and the first platform-specific navigation patterns;
   display the portion of the initial interpreted content in a first platform-specific user display format;
   receive the user action in response to displaying the initial application content; transmit the user action to the declarative content engine; and
   transmit the request from the user to continue executing the application on the second platform, and wherein the second user experience player is configured to:
receive, in response to the transmission of the user action, the next declarative content from the declarative content engine;
interpret the next declarative content to obtain a next interpreted content;
obtain, based on the next interpreted content, second platform-specific templates and second platform-specific navigation patterns for the second platform type, the second platform-specific templates comprising a second presentation of information and second user interface controls;
bind a portion of the next interpreted content to the second platform-specific templates and the second platform-specific navigation patterns; and
display the portion of the next interpreted content in a second platform-specific user display format for the second platform type.

7. The system of claim 6, wherein the declarative content engine is further configured to:
detect an error in the user action;
transmit information related to the error to the first user experience player; and
receive, in response to the transmitted information, an updated user action.

8. The system of claim 6, wherein the initial application content comprises application information comprising view information, interaction flow information, data model information, and user data information.

9. The system of claim 6, wherein the initial application content comprises at least a portion of one selected from a group consisting of a tax preparation application, a financial transaction application, and a loan request application.

10. The system of claim 6, wherein the initial declarative content 1s expressed in JavaScript Object Notation.

11. The system of claim 6, wherein the user action is received by the first user experience player in the form of one selected from a group consisting of keyboard input, mouse input, audio input, motion input, and touch input.

12. The system of claim 6, wherein the first platform-specific user display format is one selected from a group consisting of a visual format, an audio format, and a text format.

13. A non-transitory computer readable medium comprising instructions for providing application content of an application which, when executed, cause a computer processor to:
obtain, by a declarative content engine executing on the computer processor, an initial application content from a content repository;
express the initial application content in a declarative programming language to obtain initial declarative content;
transmit the initial declarative content to a first user experience player of a first platform of a first platform type, wherein the first user experience player:
interprets the initial declarative content to obtain initial interpreted content, obtains, based on the initial interpreted content, first platform-specific templates and first platform-specific navigation patterns for the first platform type, the first platform-specific templates comprising a first presentation of information and first user interface controls,
binds a portion of the initial interpreted content to the first platform-specific templates and the first platform-specific navigation patterns, and
renders the portion of the initial interpreted content in a first platform-specific user display format;
receive a user action of a user executing the application from the first user experience player in response to the transmission of the initial declarative content;
store the user action associated with the initial declarative content in a user data instance repository;
receive a request from the user to continue executing the application on a second platform of a second platform type;
determine, using an interaction module and the stored user action, a next application content based on the stored user action;
obtain the next application content from the content repository;
express the next application content in the declarative programming language to obtain a next declarative content; and
transmit the next declarative content to a second user experience player of the second platform, wherein the second user experience player:
interprets the next declarative content to obtain a next interpreted content, obtains, based on the next interpreted content, second platform-specific
templates and second platform-specific navigation patterns for the second platform type, the second platform-specific templates comprising a second presentation of information and second user interface controls,
binds a portion of the next interpreted content to the second platform-specific templates and the second platform-specific navigation patterns, and
renders the portion of the next interpreted content in a second platform- specific user display format for the second platform type.

14. The non-transitory computer readable medium of claim 13, further comprising instructions which, when executed by the computer, cause the computer processor to:
detect an error in the user action;
transmit information related to the error to the first user experience player; and
receive, in response to the transmitted information, an updated user action.

15. The non-transitory computer readable medium of claim 13, wherein the initial application content comprises application information comprising view information, interaction flow information, data model information and user data information.

16. The non-transitory computer readable medium of claim 13, wherein the initial application content is at least a portion of one selected from a group consisting of a tax preparation application, a financial transaction application, and a loan request application.

* * * * *

UNITED STATES PATENT AND TRADEMARK OFFICE
CERTIFICATE OF CORRECTION

PATENT NO.        : 10,061,861 B2
APPLICATION NO.   : 14/463415
DATED             : August 28, 2018
INVENTOR(S)       : Jay JieBing Yu et al.

Page 1 of 1

It is certified that error appears in the above-identified patent and that said Letters Patent is hereby corrected as shown below:

In the Claims

Claim 10, Column 21, Line 36, "1s" should read -- is --.

Signed and Sealed this
Fourth Day of June, 2019

Andrei Iancu
*Director of the United States Patent and Trademark Office*